United States Patent
Ishikawa et al.

(10) Patent No.: US 11,533,901 B2
(45) Date of Patent: Dec. 27, 2022

(54) TRAVELING VEHICLE

(71) Applicant: KUBOTA CORPORATION, Osaka (JP)

(72) Inventors: Shinnosuke Ishikawa, Sakai (JP); Komei Yamawaki, Sakai (JP); Ryo Kurata, Sakai (JP)

(73) Assignee: KUBOTA CORPORATION, Osaka (JP)

( * ) Notice: Subject to any disclaimer, the term of this patent is extended or adjusted under 35 U.S.C. 154(b) by 351 days.

(21) Appl. No.: 16/904,623

(22) Filed: Jun. 18, 2020

(65) Prior Publication Data

US 2021/0084884 A1 Mar. 25, 2021

(30) Foreign Application Priority Data

Sep. 25, 2019 (JP) .............................. JP2019-174697

(51) Int. Cl.
*A01M 7/00* (2006.01)
*A01C 23/00* (2006.01)

(52) U.S. Cl.
CPC ......... *A01M 7/0089* (2013.01); *A01C 23/008* (2013.01); *A01M 7/0082* (2013.01)

(58) Field of Classification Search
CPC . A01M 7/0089; A01M 23/008; A01M 7/0082
USPC ..................................... 239/69, 73, 159, 172
See application file for complete search history.

(56) References Cited

U.S. PATENT DOCUMENTS

| 4,805,088 A * | 2/1989 | Cross ................... A01M 7/0092 239/69 |
| 5,904,296 A * | 5/1999 | Doherty ................. A01C 17/00 239/69 |
| 8,942,893 B2 * | 1/2015 | Rosa .................... A01M 7/0057 239/159 |
| 2009/0000012 A1 | 1/2009 | Hsieh |
| 2009/0082930 A1 | 3/2009 | Peters |
| 2019/0000012 A1 | 1/2019 | Yagyu et al. |
| 2019/0116719 A1 | 4/2019 | Fletcher et al. |

FOREIGN PATENT DOCUMENTS

| DE | 101 40 383 A1 | 3/2003 |
| EP | 2 042 276 A2 | 4/2009 |
| EP | 3 289 847 A1 | 3/2018 |

(Continued)

OTHER PUBLICATIONS

Official Communication issued in corresponding European Patent Application No. 20180715.3, dated Dec. 14, 2020.

(Continued)

*Primary Examiner* — Steven J Ganey
(74) *Attorney, Agent, or Firm* — Keating and Bennett, LLP (57) ABSTRACT

A traveling vehicle includes a controller to control a posture of a work machine via a connector. The controller observes whether a farm field surface on which the traveling vehicle travels and the work machine maintain a predetermined positional relationship therebetween, and controls the posture of the work machine when a positional relationship between the farm field surface and the work machine changes from the predetermined positional relationship, so that the positional relationship thus changed is reset to the predetermined positional relationship.

5 Claims, 7 Drawing Sheets

(56) References Cited

FOREIGN PATENT DOCUMENTS

| | | |
|---|---|---|
| EP | 3 311 641 A1 | 4/2018 |
| EP | 3 338 522 A1 | 6/2018 |
| JP | 61-019404 A | 1/1986 |
| JP | 03-210104 A | 9/1991 |
| JP | 05-068202 U | 9/1993 |
| JP | 2002-305912 A | 10/2002 |
| JP | 2007-000083 A | 1/2007 |
| JP | 2007-053902 A | 3/2007 |
| JP | 2014-190134 A | 10/2014 |
| JP | 2019-004882 A | 1/2019 |
| JP | 2019-006372 A | 1/2019 |

OTHER PUBLICATIONS

Official Communication issued in corresponding Japanese Patent Application No. 2019-174697, dated Aug. 16, 2022.

\* cited by examiner

TRAVELING VEHICLE

CROSS REFERENCE TO RELATED APPLICATIONS

This application claims the benefit of priority under 35 U.S.C. § 119 to Japanese Patent Application No. 2019-174697 filed on Sep. 25, 2019, the entire contents of which are hereby incorporated herein by reference.

BACKGROUND OF THE INVENTION

1. Field of the Invention

The present invention relates to a traveling vehicle for controlling a posture of a work machine.

2. Description of the Related Art

An agricultural machine is commonly constituted by, for example, a plurality of types of devices such as (i) a vehicle such as a tractor, (ii) a work machine (implement), provided to the vehicle, for actually carrying out farm work, and (iii) an electronic device retrofitted to the vehicle or the work machine. The agricultural machine is commonly made available by combining and customizing these plurality of types of devices in accordance with intended farm work.

For example, Japanese Patent Application Publication Tokukai No. 2007-83 (Publication date: Jan. 11, 2007) discloses a liquid spraying device as an implement that operates while being provided at the back of a tractor.

SUMMARY OF THE INVENTION

In recent years, a technique for communicably connecting a tractor and an implement has been developed in response to a great interest in smart agriculture. It has been desired that such a technique be used to automatically control operation of an implement. It is desired, for example, that a posture of the liquid spraying device disclosed in Japanese Patent Application Publication Tokukai No. 2007-83 (Publication date: Jan. 11, 2007) be controlled so that the liquid spraying device is located at an optimum position.

Preferred embodiments of the present invention provide (i) control devices each capable of automatically controlling a posture of an implement, (ii) traveling vehicles each including such control devices, and (iii) methods for controlling postures of work machines.

A traveling vehicle in accordance with an aspect of a preferred embodiment of the present invention includes: a controller to control a posture of a work machine that is provided to the traveling vehicle via a connector, the controller controlling the posture of the work machine, in a case where a positional relationship between (a) a farm field surface on which the traveling vehicle travels and (b) the work machine has been changed from a predetermined positional relationship, so that the positional relationship thus changed is reset to the predetermined positional relationship.

With this configuration, in a case where a positional relationship between a farm field surface and the work machine has been changed from a predetermined positional relationship, a posture of the work machine is controlled so that the positional relationship thus changed is reset to the predetermined positional relationship. This results in achievement of a traveling vehicle capable of automatically controlling a posture of a work machine.

A traveling vehicle in accordance with an aspect of a preferred embodiment of the present invention can be configured such that the controller is configured or programmed to include: a monitoring section to detect a change in positional relationship between the farm field surface and the work machine in accordance with at least one of (i) a change in shape of at least a portion of the connector, (ii) a change in inclination of the traveling vehicle, and (iii) an arrival of the work machine, following the traveling vehicle, at a point at which an inclination of the traveling vehicle has been changed; and a control section to change a shape of the connector so as to control the posture of the work machine so that the positional relationship whose change has been detected by the monitoring section is reset to the predetermined positional relationship.

A traveling vehicle in accordance with an aspect of a preferred embodiment of the present invention can be configured such that the connector is a three point linkage mechanism, and the control section controls the posture of the work machine by extending or shortening a length of a top link of the three point linkage mechanism.

A traveling vehicle in accordance with an aspect of a preferred embodiment of the present invention can be configured such that the controller is configured or programmed to include: a storage section to store therein association information indicative of a correspondence among (a) an angle of a lower link of the three point linkage mechanism, (b) the length of the top link, and (c) the posture of the work machine, the control section determines that the length of the top link is a target length, the length corresponding, in the association information, to (i) the angle of the lower link which angle is obtained in a case where the positional relationship between the farm field surface and the work machine has been changed and (ii) a target posture of the work machine to allow the farm field surface and the work machine to be in the predetermined positional relationship, and the control section controls the top link so that the top link has the target length.

A traveling vehicle in accordance with an aspect of a preferred embodiment of the present invention can be configured such that the control section specifies the target posture of the work machine in accordance with inclination data (i) obtained in advance concerning a farm field on which the traveling vehicle is traveling and (ii) showing unevenness of the farm field.

A traveling vehicle in accordance with an aspect of a preferred embodiment of the present invention can be configured such that the control section controls the length of the top link in accordance with a posture control map that has been outputted by a deep learning model and on which a target top link length is plotted for each point in the farm field on which the traveling vehicle is traveling, and the deep learning model is constructed so as to output the posture control map, by machine learning, by using, as an input, a traveling condition including at least one of (a) a speed of the traveling vehicle, (b) a speed at which to control extension or shortening of the top link, (c) an inclination angle of the farm field surface, (d) information indicating whether the traveling vehicle is traveling upward or traveling downward, (e) a property of soil of the farm field, and (f) a moisture content in the farm field.

Various aspects of preferred embodiments of the present invention make it possible to automatically control a posture of an implement.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

Preferred Embodiment 1

Figure 2:
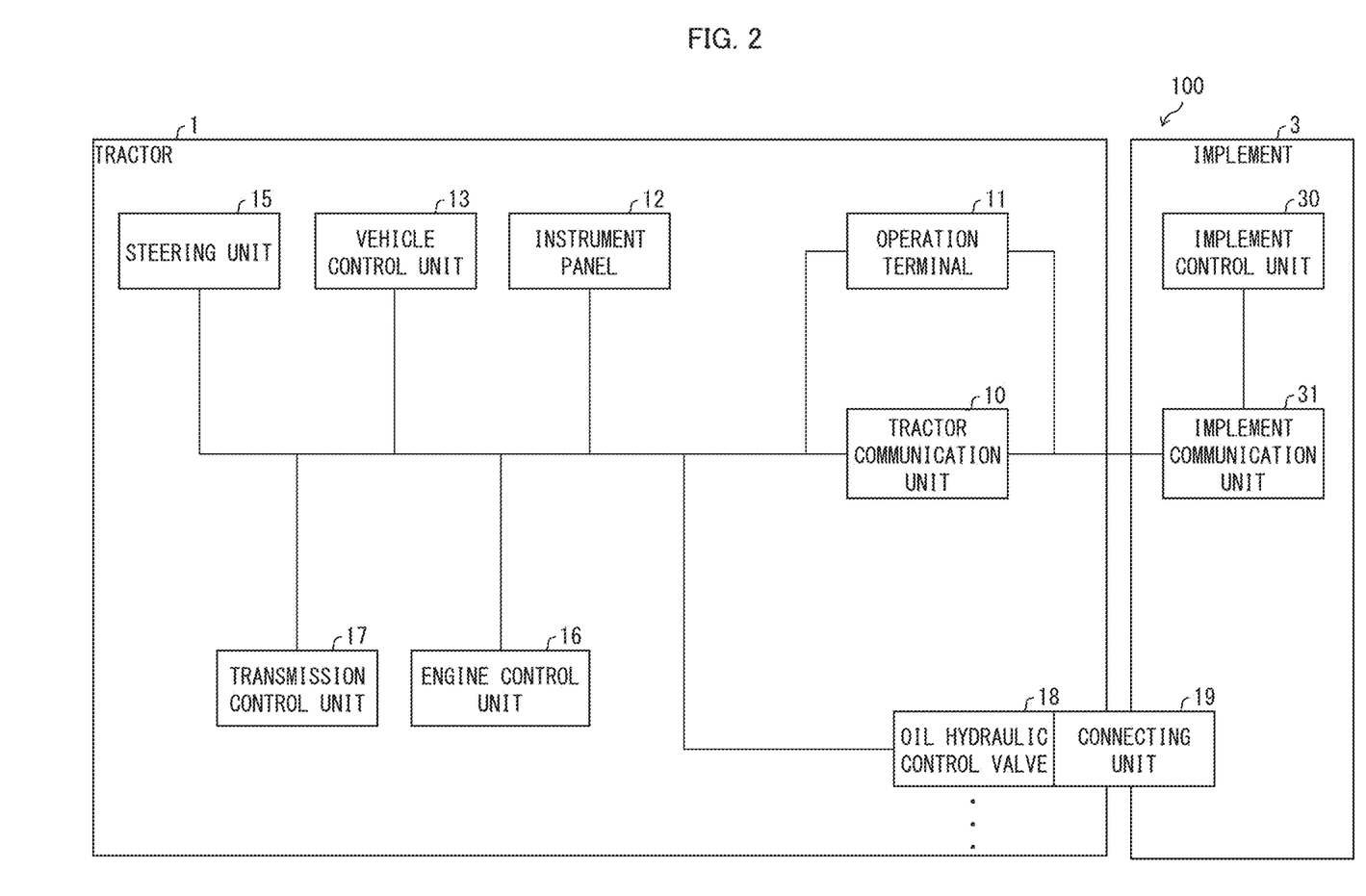
FIG. 2 is a block diagram schematically illustrating a configuration of an agricultural machine and a system for controlling the agricultural machine.

FIG. 2 is a block diagram schematically illustrating a configuration of an agricultural machine and a system for controlling the agricultural machine (hereinafter referred to as an "agricultural machine control system").

For example, an agricultural machine 100 preferably at least includes (i) a tractor 1 (traveling vehicle), which is a traveling vehicle, and (ii) an implement 3 (work machine), which is a work machine for carrying out farm work. The agricultural machine 100 can also include other device(s) (not illustrated).

For example, the tractor 1 includes a tractor communication unit 10, an operation terminal 11, an instrument panel 12, a vehicle control unit 13 (control device), a steering unit 15, an engine control unit 16, a transmission control unit 17, and at least one oil hydraulic control valve 18, each of which is provided in a vehicle. The tractor 1 further includes a connecting unit 19. The connecting unit 19 is provided at the rear of the vehicle in a case where, for example, a direction toward which the vehicle travels is assumed to be the front. Note that the tractor 1 can include other component(s) (not illustrated) that a common tractor includes.

The implement 3 includes an implement control unit 30 and an implement communication unit 31. Note that the implement 3 can include other component(s) (not illustrated) that a common implement includes. In Preferred Embodiment 1, the implement 3 is, for example, a chemical solution spraying machine for spraying, over a farm field, a chemical solution such as a fertilizer or an insect repellent, and includes, for example, a tank and a nozzle each described later.

The operation terminal 11 is a terminal device that causes software to carry out a display process and an input process of the agricultural machine 100. The operation terminal is realized by, for example, a touch panel. The operation terminal 11 can display information that is specialized in farm work and is more specific than information displayed in the instrument panel 12. The operation terminal 11 is provided, for example, near a driver seat of the tractor 1. With the configuration, while sitting on the driver seat, a driver can carry out a touch operation with respect to the operation terminal 11 so as to (i) cause the operation terminal 11 to display necessary information (e.g., respective current states of the tractor 1 and the implement 3) and (ii) input a necessary instruction to each of the tractor 1 and the implement 3.

The instrument panel 12 is a display system for displaying basic information on the vehicle, such as fuel for the tractor 1, an engine speed of the tractor 1, and a traveling speed of the tractor 1.

The vehicle control unit 13 communicates with the implement control unit 30 via the tractor communication unit 10 and the implement communication unit 31 so as to collectively control sections of the tractor 1 serving as a traveling vehicle. For example, the vehicle control unit 13 controls the at least one oil hydraulic control valve 18 so as to control operation of the connecting unit 19. The vehicle control unit 13 controls, for example, the engine control unit 16 and the transmission control unit 17 in accordance with (i) an instruction from the steering unit 15 that the driver operates or (ii) a signal supplied from the tractor communication unit 10. The engine control unit 16 is configured to control driving of an engine. The transmission control unit 17 is configured to control driving of a transmission.

The steering unit 15 is an input system that allows the driver to operate the tractor 1. The steering unit 15 includes, for example, a steering wheel, a shift lever, a brake, a switch, and a dial. The steering unit 15 may also control steering during automatic driving.

The at least one oil hydraulic control valve 18 is a mechanism for controlling an oil hydraulic pressure serving as a power source of the connecting unit 19. The at least one oil hydraulic control valve 18 controls, for example, a pressure, a flow rate, and a direction of a fluid (here, oil) in accordance with an instruction from the vehicle control unit 13. Thus, operation and a posture of the connecting unit 19 are controlled.

The connecting unit 19 is a mechanism for physically connecting the tractor 1 and the implement 3. In Preferred Embodiment 1, the connecting unit 19 is, for example, a three point linkage mechanism disclosed in Japanese Patent Application Publication Tokukai No. 2019-6372 (Publication date: Jan. 17, 2019).

The tractor communication unit 10 carries out mutual communication with the implement communication unit 31 of the implement 3. The mutual communication can be, for example, communication that conforms to ISO11783, which is an international standard. Agricultural Industry Electronics Foundation (AEF), which is an industrial association, has made ISO11783 widely popular, as a global standard, mainly among large agricultural machines. Furthermore, a tractor implement management (TIM) system is provided in an agricultural machine control system 100A. The TIM refers to a technique for precisely controlling a tractor and an implement by (i) guaranteeing compatibility between the tractor and the implement, which are products made by different manufacturers, and (ii) achieving interactive communication. The agricultural machine control system 100A, in which the TIM system is provided, allows a control signal from the implement 3 to be received by the tractor communication unit 10. In accordance with the control signal, the vehicle control unit 13 can carry out, for example, (i) speed control with respect to the tractor 1 and (ii) height control with respect to the connecting unit 19.

The implement control unit 30 is configured to collectively control sections of the implement 3. The implement control unit 30 controls operation of the implement 3 and sends necessary information to the tractor 1 via the implement communication unit 31.

The control units (described earlier) and the communication units (described earlier) are typically electronic control units (ECUs). The ECUs preferably each include (i) hardware such as a central processing unit (CPU), a communication dedicated circuit, a digital signal input circuit, a digital signal output circuit, and an analog signal input circuit and (ii) a storage device in which various pieces of software such as a control program are stored. Furthermore, the ECUs are connected by, for example, the international standard ISO11783 that is called ISOBUS and based on a control area network (CAN).

Figure 3:
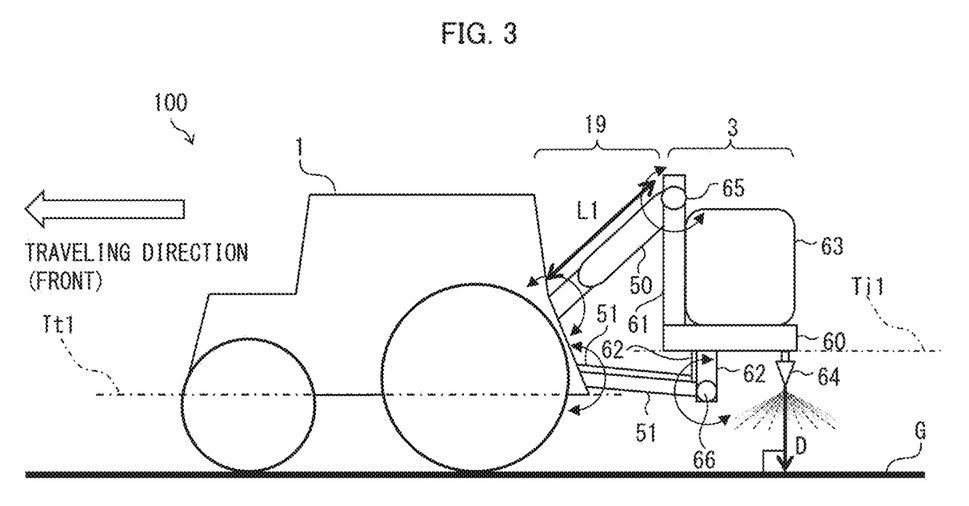
FIG. 3 is a side view schematically illustrating an agricultural machine as viewed laterally.
Figure 4:
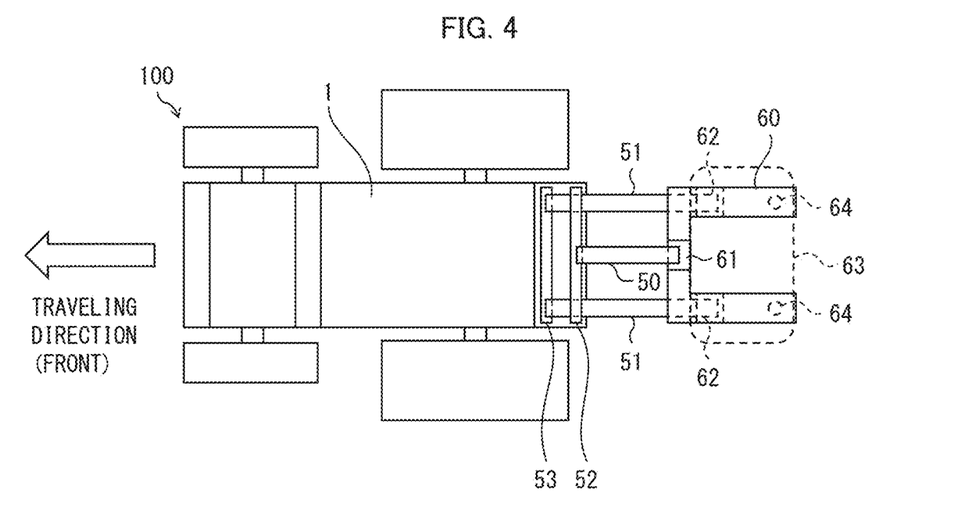
FIG. 4 is a top view schematically illustrating an agricultural machine as viewed from above.

FIG. 3 is a side view schematically illustrating the agricultural machine 100 as viewed laterally. FIG. 4 is a top view schematically illustrating the agricultural machine 100 as viewed from above.

As illustrated in FIG. 3, the agricultural machine 100 is configured such that the tractor 1 and the implement 3 are connected via the connecting unit 19 that is provided at the back of the tractor 1 (the rear of the tractor 1 in a case where a direction toward which the tractor 1 travels is assumed to be the front).

As described earlier, the connecting unit 19 preferably is, for example, a three point linkage mechanism disclosed in Japanese Patent Application Publication Tokukai No. 2019-6372 (Publication date: Jan. 17, 2019). The connecting unit 19 includes, for example, one (1) top link 50 and two lower links 51. The top link 50 includes, for example, an oil hydraulic cylinder, and a length of the top link 50 is adjusted by the at least one oil hydraulic control valve 18. The lower links 51 are supported by, for example, a supporting mechanism (not illustrated) that is extended or shortened by an oil hydraulic pressure, such as a lift rod. In a case where a length of the lift rod is adjusted by the at least one oil hydraulic control valve 18, it is possible to maintain an angle of the lower links at a desired angle by rotating the lower links 51 on a horizontal shaft 52. Thus, a height of the implement 3 that is supported by the lower links 51 is controlled.

The connecting unit 19 can include a power take-off (PTO) (not illustrated). The PTO is a mechanism for taking off engine-derived power of the tractor 1 in a form of rotary power. The rotary power that has been taken off via the PTO serves as a power source for driving the implement 3.

As described earlier, the implement 3 is, for example, a chemical solution spraying machine. The implement 3 includes (i) a tank 63 in which to contain a chemical solution, (ii) nozzles 64 each for spraying a chemical solution, and (iii) a fitting frame for fixing the tank 63 and the nozzles 64 so as to support the tank 63 and the nozzles 64.

The fitting frame generally includes (i) a placing table frame 60 on which to place the tank 63, (ii) a column frame 61 that is responsible for connection with the top link 50 and support of the tank 63, and (iii) vertical frames 62 that are responsible for connection with the lower links 51. The nozzles 64 can be provided, for example, below the placing table frame 60.

The column frame 61 is provided with a top link connecting section 65. To the column frame 61, the top link 50 is connected via the top link connecting section 65. The vertical frames 62 are provided with respective lower link connecting sections 66. The lower links 51 are connected to the respective vertical frames 62 via the lower link connecting sections 66.

The configuration described earlier makes it possible to control the agricultural machine 100 as below. Specifically, for example, first, the tractor 1 controls the height of the implement 3, which is connected thereto, by (i) extending or shortening a length of a lift rod (not illustrated) by controlling the at least one oil hydraulic control valve 18 and (ii) regulating the angle of the lower links 51 (see FIG. 5) (S1). For example, in a case where the tractor 1 and the implement 3 are located on a flat ground, such a height control process in S1 is carried out before farm work is started. The height of the implement 3 which height is determined by the height control process in S1 can be a proper height that is determined in advance in accordance with an object of the farm work or a function of the implement 3. The height can be, for example, a height from the flat ground (described earlier) to a reference position (Ti1) of the implement 3 or a height from a reference position (Tt1) of the tractor 1 to the reference position (Ti1) of the implement 3.

Figure 5:
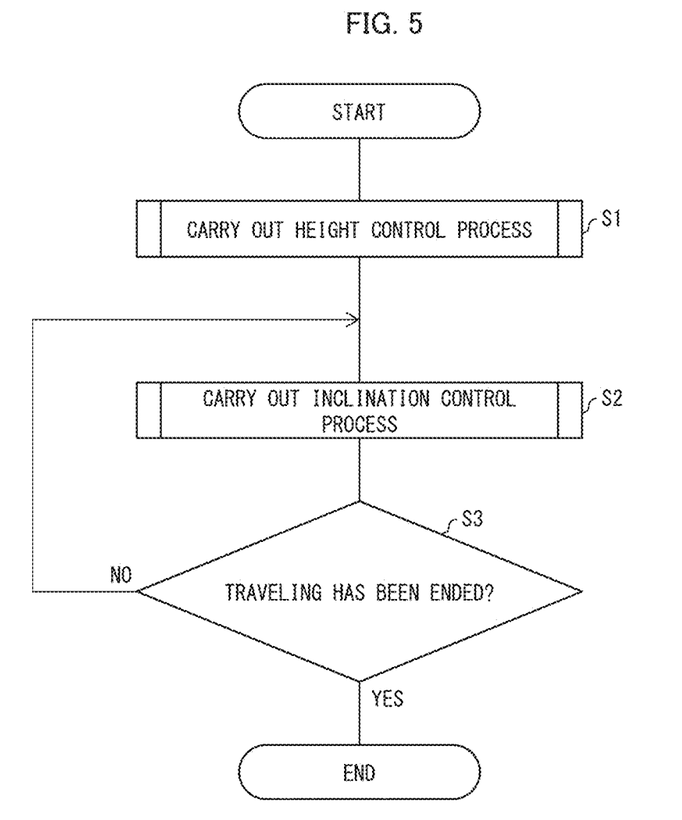
FIG. 5 is a flowchart schematically showing a posture control process carried out by an agricultural machine control system.

After control of the height of the implement 3 is finished, for example, the tractor 1 starts traveling on a farm field surface G. In accordance with unevenness of the farm field surface G, the tractor 1 that is traveling on the farm field surface G causes the top link 50 to control an inclination of the implement 3 (S2). For example, such an inclination control process in S2 is continued as necessary while the agricultural machine 100 is traveling on the farm field surface G (the process returns from NO in S3 to S2).

In a case where the inclination control process is more specifically described, the inclination of the implement 3 is controlled by the length of the top link 50 (hereinafter referred to as a "top link length L"), which length is controlled by the at least one oil hydraulic control valve 18. For example, in the examples of FIGS. 3 and 4, a relative inclination of the implement 3 with respect to the tractor 1 is 180° in the top link length L1. That is, in a case where the top link length is L1, an inclination of a reference axis Ti of the implement 3 is identical to an inclination of a reference axis Tt of the tractor 1. In a case where the top link length L is made shorter than L1, the reference axis Ti of the implement 3 inclines forward so as to be spaced away from the farm field surface G (a traveling surface). In a case where the top link length L is made longer than L1, the reference axis Ti inclines backward so as to be close to the farm field surface G.

In a case where the reference axis Ti of the implement 3, which reference axis Ti is relative to the reference axis Tt of the tractor 1, is thus controlled, an angle of a direction D of ejection of a chemical solution through a nozzle 64 (hereinafter referred to as "an ejection direction D of a nozzle 64") with respect to the farm field surface G is appropriately adjusted so as to be an appropriate angle (e.g., 90°) with respect to the farm field surface G.

For example, the height of the implement 3 can be controlled once before traveling, or can also be controlled as necessary during traveling.

Figure 1:
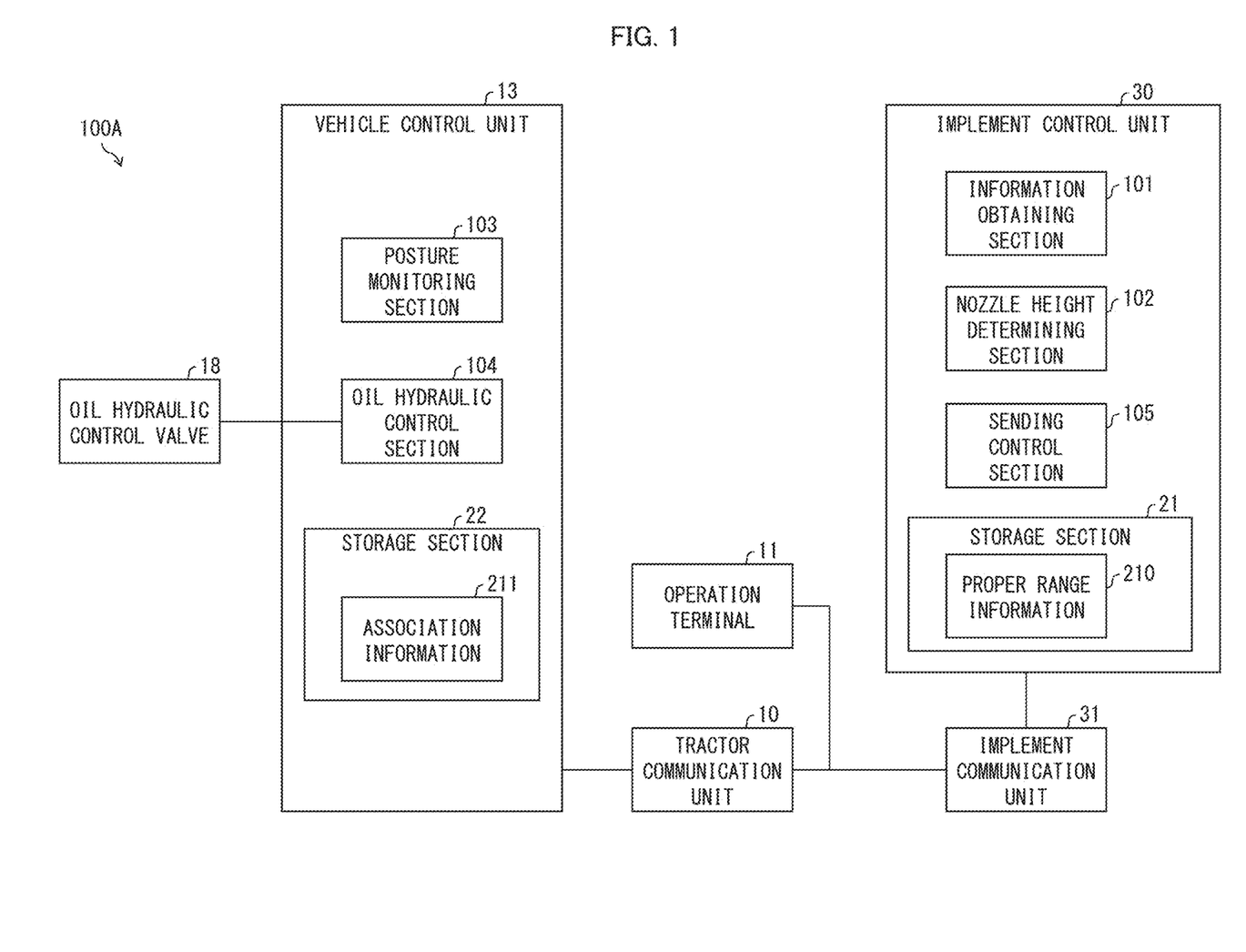
FIG. 1 is a block diagram illustrating a configuration of a main portion of a tractor control section.

FIG. 1 is a block diagram illustrating a main portion of the agricultural machine control system 100A for carrying out (i) the height control process with respect to the implement 3 and (ii) the inclination control process. For example, the agricultural machine control system 100A at least includes the vehicle control unit 13 and the implement control unit 30. As described earlier, the vehicle control unit 13 and the implement control unit 30 can (i) communicate with each other via the tractor communication unit 10 and the implement communication unit 31 and (ii) send/receive information to/from each other.

For example, the implement control unit 30 includes an information obtaining section 101 (obtainment section), a nozzle height determining section 102 (determination section), and a sending control section 105. The vehicle control unit 13 includes a posture monitoring section 103 (monitoring section) and an oil hydraulic control section 104 (control section).

The sections (described earlier) shown as being provided in the implement control unit 30 are each a functional block. The functional block can be realized in a case where a CPU (not illustrated) reads out, to, for example, a random access memory (RAM) (not illustrated), a program stored in a storage device such as a storage section 21.

The sections (described earlier) shown as being provided in the vehicle control unit 13 are each a functional block. The functional block can be realized in a case where a CPU (not illustrated) reads out, to, for example, a random access memory (RAM) (not illustrated), a program stored in a storage device such as a storage section 22.

The information obtaining section 101 obtains various pieces of implement information detected by various sensors provided in the implement 3. The implement information includes, for example, a rotation speed of the PTO, an oil hydraulic pressure, an inclination of the implement 3, and a nozzle height. The inclination of the implement 3 can be, for example, a relative inclination of the reference axis Ti of the implement 3 with respect to the reference axis Tt of the tractor 1 (see FIG. 7), or an inclination of the reference axis Ti of the implement 3 with respect to the farm field surface G. The nozzle height can be, for example, a distance from the farm field surface G illustrated in FIG. 3 to a tip of the nozzle 64. For example, the implement 3 includes a distance measuring sensor for measuring the nozzle height, such as a laser sensor or an ultrasonic sensor. The information obtaining section 101 (i) obtains, in a form of the nozzle height, a value detected by the distance measuring sensor and (ii) supplies the value to the nozzle height determining section 102.

The nozzle height determining section 102 (i) compares (a) a current nozzle height obtained by the information obtaining section 101 and (b) proper range information 210 read out from the storage section 21 and (ii) determines whether the current nozzle height is proper.

For example, the nozzle height determining section 102 determines whether the nozzle height obtained falls within a proper range determined in advance. For example, a proper range of the nozzle height is determined in advance in accordance with a chemical solution to be sprayed or specifications of a chemical solution spraying machine. The proper range information 210 indicative of that proper range is stored in the storage section 21. The proper range information 210 can indicate, for example, a range of 65 cm to 85 cm.

The sending control section 105 controls the implement communication unit 31 so as to timely send, to the operation terminal 11 or the tractor communication unit 10 of the tractor 1, information processed by the information obtaining section 101 and the nozzle height determining section 102.

For example, in a case where the nozzle height determining section 102 has determined that the current nozzle height H falls outside the proper range, the sending control section 105 sends a nozzle height change request to the tractor communication unit 10 via the implement communication unit 31. The nozzle height change request is information that the implement 3 requests to the tractor 1 to control the connecting unit 19 so that the nozzle height is changed. The nozzle height change request includes, for example, (i) the current nozzle height obtained by the information obtaining section 101 and (ii) a target nozzle height. The target nozzle height can be stored in, for example, the storage section 21 in advance. Furthermore, the sending control section 105 can (i) send, to the operation terminal 11, a notification that the nozzle height is improper and (ii) allow an operator to recognize the notification on a screen. The nozzle height change request is sent to the vehicle control unit 13 via the tractor communication unit 10.

The sending control section 105 can send not only the nozzle height change request but also the above-described pieces of implement information concerning operation of the implement (a rotation speed of the PTO, an oil hydraulic pressure, a nozzle height, and an inclination of the implement 3) as necessary during traveling or at a predetermined timing during traveling.

The tractor communication unit 10 sends information, supplied from the implement communication unit 31, to, for example, the vehicle control unit 13 in accordance with, for example, an ISOBUS communication protocol.

The posture monitoring section 103 monitors respective postures of the tractor 1 and the implement 3. Specifically, the posture monitoring section 103 obtains, via the tractor communication unit 10, (i) the implement information sent from the implement 3 or (ii) the nozzle height change request sent from the implement 3. The posture monitoring section 103 specifies a current nozzle height of the implement 3 in accordance with the implement information obtained or the nozzle height change request obtained. The posture monitoring section 103 specifies a current inclination of the tractor 1 in accordance with a value detected by, for example, an inclination sensor, an acceleration sensor, a gyro sensor, or an inertial sensor (e.g., inertial measurement unit (IMU)) of the tractor 1. Furthermore, in accordance with a measured inclination of the tractor 1, the posture monitoring section 103 stores, in the storage section 22, inclination data showing an inclination of the farm field surface G. The posture monitoring section 103 can specify a positional relationship between the implement 3 and the farm field surface G in accordance with the stored inclination data in a case where the tractor 1 passes a certain place and then the implement 3 arrives at the certain place. For example, the posture monitoring section 103 specifies whether the ejection direction D of the nozzle 64 is perpendicular to the farm field surface G, at what angle the ejection direction D of the nozzle 64 inclines forward in a traveling direction, or at what angle the ejection direction D of the nozzle 64 inclines backward in a direction opposite from the traveling direction. In a case where the IMU is provided in the implement 3, the inclination of the implement 3 which inclination has been detected by the IMU is sent, in a form of implement information, to the tractor communication unit 10 via the implement communication unit 31. The posture monitoring section 103 can specify a positional relationship between the nozzle 64 and the farm field surface G in accordance with (i) the inclination of the implement 3 which inclination has been obtained via the tractor communication unit 10 and (ii) inclination data of the farm field surface G. The posture monitoring section 103 can specify a current nozzle height of the nozzle 64 in accordance with the current nozzle height that is supplied from the implement 3.

The oil hydraulic control section 104 controls the posture of the implement 3 by operating the at least one oil hydraulic control valve 18 so as to change or maintain a shape of the connecting unit 19. Assume, for example, that the nozzle height change request is sent from the implement 3. In this case, the oil hydraulic control section 104 controls the angle of the lower links 51 by carrying out the height control process so as to regulate the length of the lift rod so that the current nozzle height reaches and is maintained at the target nozzle height. In Preferred Embodiment 1, the nozzle height determining section 102 of the implement control unit 30 sends, to the tractor communication unit 10 via the implement communication unit 31, a nozzle height properness notification indicating that the current nozzle height has reached the target nozzle height. In a case where the tractor communication unit 10 has received the nozzle height properness notification, the oil hydraulic control section 104 maintains the angle of the lower links 51. This allows the nozzle height to be maintained in the proper range.

Subsequently, the oil hydraulic control section 104 carries out the inclination control process during traveling so as to control the at least one oil hydraulic control valve 18 so that the inclination of the implement 3 is appropriately set in accordance with unevenness of the farm field surface G. For example, the oil hydraulic control section 104 changes the shape of the connecting unit 19 so that the reference axis Ti of the implement 3 has a target posture (for example, is parallel to the farm field surface G), i.e., so that the ejection direction D of the nozzle 64 is perpendicular to the farm field surface G. Specifically, in order for the top link length L to be appropriately set, the oil hydraulic control section 104 determines, for example, a pressure and a flow rate of a fluid in the oil hydraulic cylinder of the top link 50 so as to control each of the at least one oil hydraulic control valve 18.

The oil hydraulic control section 104 maintains a current top link length L of the tractor 1 in the storage section 22. Furthermore, the oil hydraulic control section 104 refers to association information 211 as appropriate in the storage section 22, the association information 211 indicating a correspondence between (a) the angle of the lower links 51 and the top link length L and (b) an angle of the ejection direction D of the nozzle 64. This allows the oil hydraulic control section 104 to determine a target top link length L and control the at least one oil hydraulic control valve 18. More specifically, the oil hydraulic control section 104 calculates the target top link length L in accordance with a current positional relationship between the implement 3 and the farm field surface G, the current top link length L, a current angle of the lower links 51, and the association information 211. The target top link length L is, for example, a length that causes the implement 3 (the reference axis Ti thereof) to be parallel to the farm field surface G, i.e., a length that causes the ejection direction D of the nozzle 64 to be perpendicular to the farm field surface G. The oil hydraulic control section 104 (i) determines, in accordance with a difference between the current top link length L and the target top link length L thus calculated, how long to shorten or extend the top link 50, and (ii) controls the at least one oil hydraulic control valve 18.

In another preferred embodiment, the implement 3 that conforms to ISOBUS can adjust the length of the top link 50 of the tractor 1 so as to control the inclination thereof. Note, however, that a configuration in which a control unit provided in the tractor 1 controls a shape of the top link 50 as in Preferred Embodiment 1 is particularly advantageous from the following viewpoint. The connecting unit 19 that is provided in the tractor 1 has various types of shapes and sizes. Thus, the top link 50 varies in shape and size according to the tractor 1. This makes it difficult for the implement 3 to adjust the top link length L in accordance with various sizes and various shapes of the top link 50. It is therefore more efficient that a control unit (e.g., the vehicle control unit 13) provided in the tractor 1 carry out the inclination control process with respect to the implement 3 as in Preferred Embodiment 1.

As described earlier, in Preferred Embodiment 1, for example, the association information 211 indicative of a correspondence between (a) the angle of the lower links 51 and the top link length L and (b) the inclination of the reference axis Ti of the implement 3 is stored in the storage section 22 of the vehicle control unit 13 in advance. In the association information 211, the angle of the ejection direction D of the nozzle 64 instead of the inclination of the reference axis Ti of the implement 3 can be alternatively associated with the angle of the lower links 51 and the top link length L.

The association information 211 can be a table showing the correspondence between (a) the angle of the lower links 51 and the top link length L and (b) the inclination of the reference axis Ti of the implement 3. Alternatively, the association information 211 can be a function that allows the inclination of the reference axis Ti to be determined from the angle of the lower links 51 and the top link length L.

The association information 211 is information indicating that a relative inclination of the reference axis Ti of the implement 3 with respect to the reference axis Tt of the tractor 1 is 0° in a case where, for example, the lower links 51 have a certain specific angle and the top link length L is L1. Furthermore, the association information 211 is information indicating that the relative inclination is 02 in a case where the top link length L is L2, . . . the relative inclination is ex in a case where the top link length L is Lx.

The following description will schematically discuss the inclination control process carried out by the oil hydraulic control section 104. Assume, for example, that the posture monitoring section 103 specifies, in accordance with the inclination data of the farm field surface G and a value measured by the inertial sensor, that the ejection direction D of the nozzle 64 inclines forward in the traveling direction with respect to the farm field surface G. In this case, in accordance with the posture monitoring section 103 having specified an angle of the nozzle 64 as described earlier, the oil hydraulic control section 104 makes a decision to make the current top link length L longer. The oil hydraulic control section 104 extends the top link 50 in accordance with the decision. This causes the implement 3 to incline backward. Consequently, the ejection direction D of the nozzle 64 which ejection direction D inclined forward is corrected. This makes the nozzle 64 perpendicular to the farm field surface G. When the ejection direction D is made perpendicular to the farm field surface G, the oil hydraulic control section 104 stops extending the top link 50 and then maintains the top link length L.

In contrast, assume, for example, that the posture monitoring section 103 specifies, in accordance with the inclination data of the farm field surface G and a value measured by the inertial sensor, that the ejection direction D of the nozzle 64 inclines backward with respect to the farm field surface G. In this case, in accordance with the posture monitoring section 103 having specified an angle of the nozzle 64 as described earlier, the oil hydraulic control section 104 makes a decision to make the current top link length L shorter. The oil hydraulic control section 104 shortens the top link 50 in accordance with the decision. This causes the implement 3 to incline forward. Consequently, the ejection direction D of the nozzle 64, which ejection direction D is inclined backward, is corrected. This makes the nozzle 64 perpendicular to the farm field surface G. When the ejection direction D is made perpendicular to the farm field surface G, the oil hydraulic control section 104 stops shortening the top link 50 and then maintains the top link length L.

Figure 6:
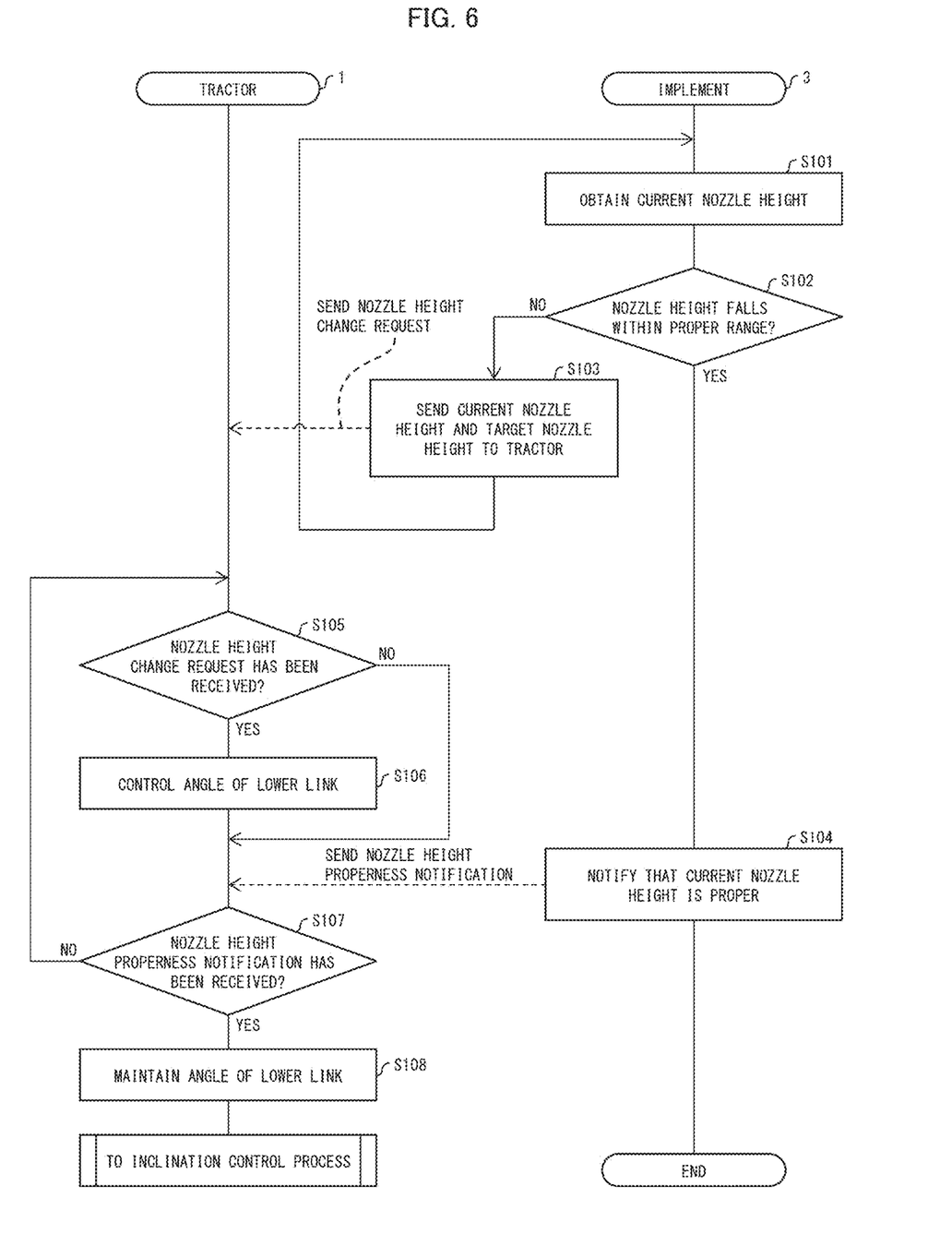
FIG. 6 is a flowchart showing a flow of a height control process carried out by an agricultural machine control system.

The following description will specifically discuss, with reference to FIG. 6, the height control process carried out by the agricultural machine control system 100. FIG. 6 is a flowchart showing a flow of the height control process. For example, before traveling, the height control process is carried out as a stage of preparation for traveling in a state in which the agricultural machine 100 is provided on the flat ground as illustrated in FIG. 3. The height control process is timely started in accordance with a driver's instruction or after the agricultural machine control system 100A is turned on.

In step S101, the information obtaining section 101 of the implement 3 obtains the current nozzle height from the distance measuring sensor.

In step S102, the nozzle height determining section 102 compares (a) the current nozzle height obtained and (b) the proper range information 210 so as to determine whether the current nozzle height falls within the proper range. The nozzle height determining section 102 which has determined that the current nozzle height falls outside the proper range proceeds from NO in S102 to S103. The nozzle height determining section 102 which has determined that the current nozzle height falls within the proper range proceeds from YES in S102 to S104.

In step S103, the nozzle height determining section 102 sends, to the tractor 1 via the implement communication unit 31, the nozzle height change request indicative of the current nozzle height and the target nozzle height. While the current nozzle height falls outside the proper range, the implement control unit 30 returns to S101 and continues monitoring the current nozzle height.

In step S104, the nozzle height determining section 102 sends, to the tractor 1 via the implement communication unit 31, the nozzle height properness notification indicating that the current nozzle height falls within the proper range.

In step S105, the oil hydraulic control section 104 of the tractor 1 proceeds from YES in S105 to step S106 in a case where the tractor communication unit 10 has received the nozzle height change request. The oil hydraulic control section 104 proceeds from NO in S105 to step S107 in a case where the tractor communication unit 10 has received the nozzle height properness notification.

In step S106, the oil hydraulic control section 104 regulates the length of the lift rod (not illustrated) so as to control the angle of the lower links 51. Specifically, the oil hydraulic control section 104 controls the angle of the lower links 51 so that the current nozzle height comes close to the target nozzle height. For example, in a case where the current nozzle height is lower than the target nozzle height, the oil hydraulic control section 104 shortens the length of the lift rod so as to lift the lower links 51. This causes the implement 3 to be farther away from the ground, so that the current nozzle height reaches the target nozzle height. For example, in a case where the current nozzle height is higher than the target nozzle height, the oil hydraulic control section 104 extends the length of the lift rod so as to lower the lower links 51. This causes the implement 3 to be closer to the ground, so that the current nozzle height reaches the target nozzle height. During a period from when the nozzle height change request is received to when the nozzle height properness notification is received, the oil hydraulic control section 104 continues extending or shortening the lift rod.

In step S107, in a case where the tractor communication unit 10 has received the nozzle height properness notification, the oil hydraulic control section 104 stops extending or shortening the lift rod. The oil hydraulic control section 104 proceeds from YES in S107 to S108.

In step S108, the oil hydraulic control section 104 (i) causes the storage section 22 to store therein the angle of the lower links 51, which angle is obtained in a case where it has been notified that the nozzle height is proper, and (ii) maintains that angle of the lower links 51.

In step S109, the vehicle control unit 13 starts traveling and carries out, as necessary, inclination control in S2 shown in FIG. 5.

Figure 7:
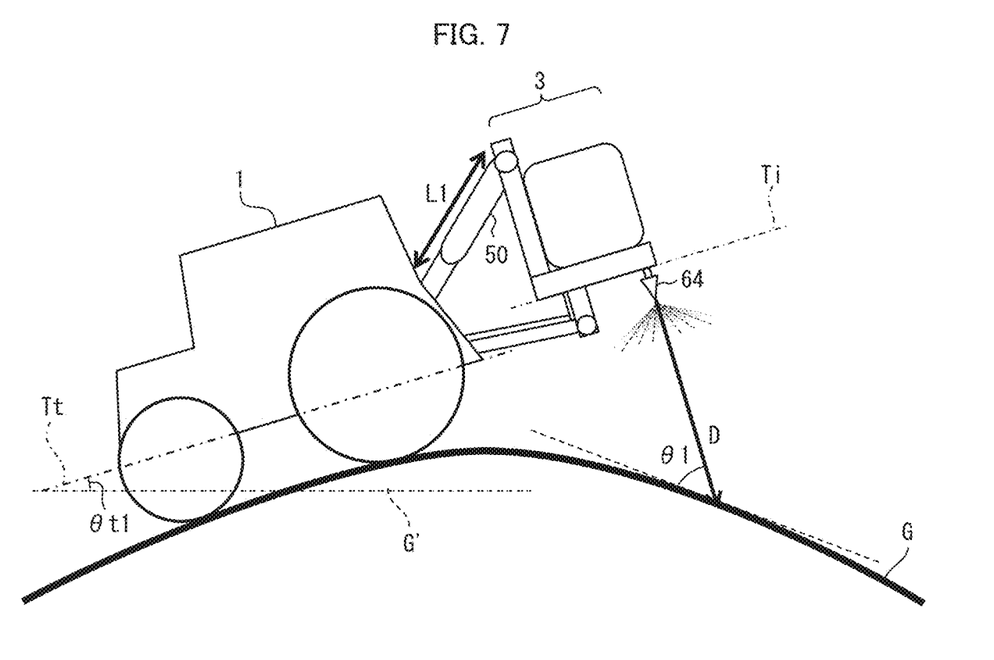
FIG. 7 is a view illustrating a state of an agricultural machine, as viewed laterally, in a case where a tractor approaches a downward slope immediately after passing an upward slope.
Figure 8:
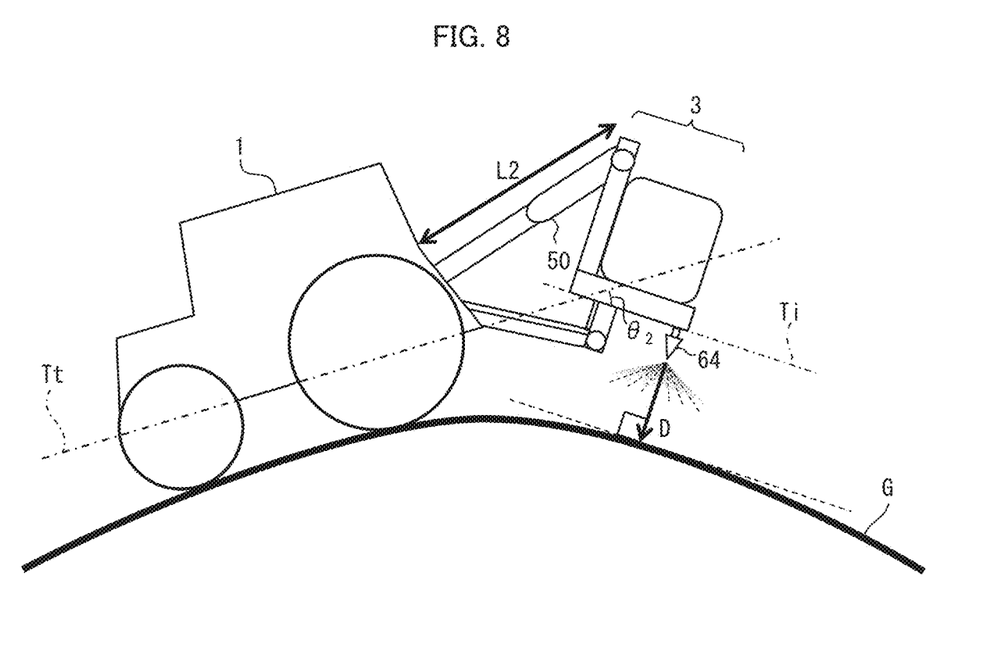
FIG. 8 is a view illustrating a state of an agricultural machine in a case where a posture of an implement is appropriately controlled after a tractor approaches a downward slope.
Figure 9:
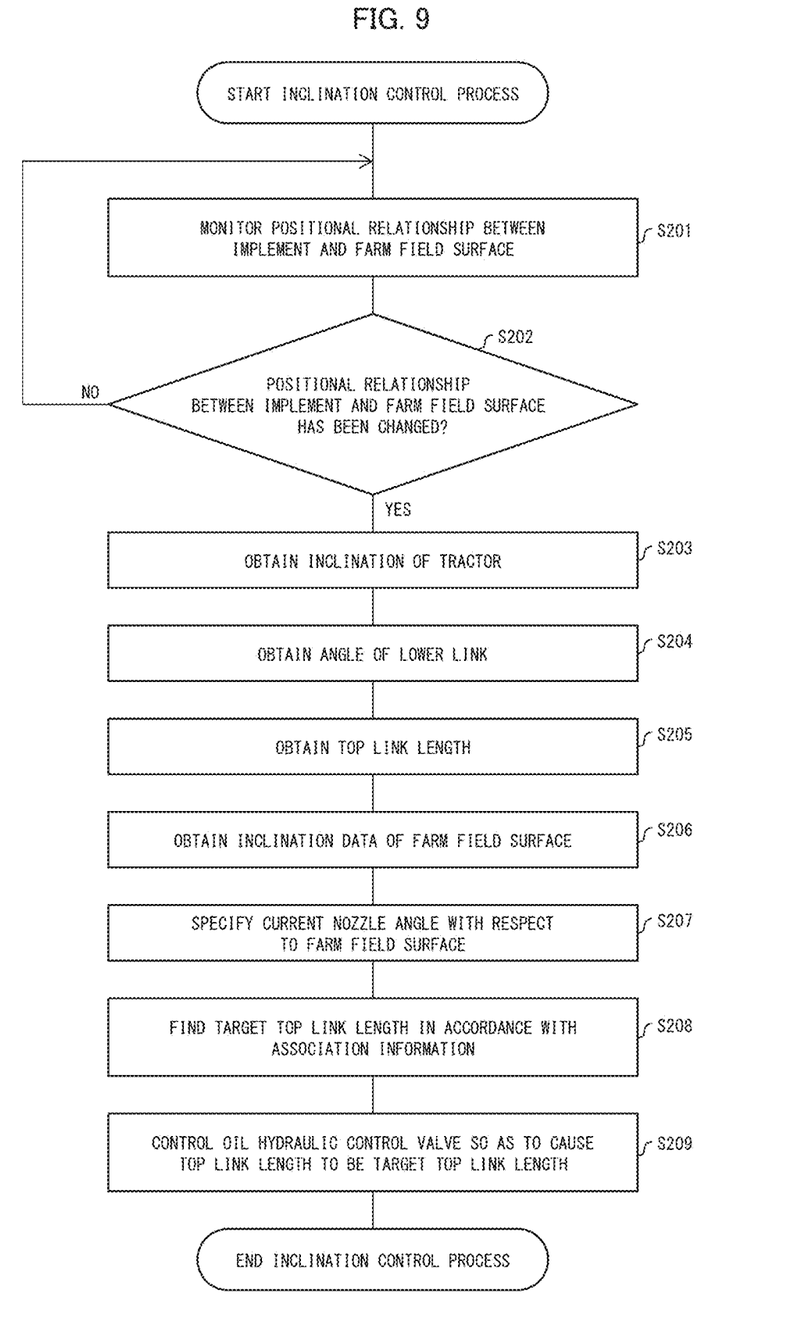
FIG. 9 is a flowchart showing a flow of an inclination control process carried out by a vehicle control unit.

The following description will specifically discuss, with reference to FIGS. 7 to 9, a flow of the inclination control process carried out by the vehicle control unit 13.

FIG. 7 is a view illustrating a state of the agricultural machine 100, as viewed laterally, in a case where the tractor 1 approaches a downward slope immediately after passing an upward slope. FIG. 8 is a view illustrating a state of the agricultural machine 100 in a case where the posture of the implement 3 is appropriately controlled after the tractor 1 approaches a downward slope. In a case where it is determined, in the state of the agricultural machine 100, which state is illustrated in FIG. 7, that it is necessary for the implement control unit 30 of the implement 3 to carry out the height control process, the height control process shown in FIG. 6 can be carried out before the inclination control process described below.

FIG. 9 is a flowchart showing a flow of the inclination control process carried out by the vehicle control unit 13. A series of processes shown in FIG. 9 is carried out, for example, during a period from when traveling is started after the vehicle control unit 13 and the implement control unit 30 are turned on so as to be connected online to when traveling is ended.

As illustrated in FIG. 7, in a case where the tractor approaches a downward slope immediately after passing an upward slope, the tractor 1 (reference axis Tt) inclines, and the reference axis Ti of the implement 3, which reference axis Ti is parallel to the reference axis Tt as illustrated in FIG. 3, also similarly inclines. This changes a positional relationship between (a) the implement 3 that is still passing the upward slope and (b) the farm field surface G, so that the ejection direction D of the nozzle 64 is not perpendicular to the farm field surface G. Unless the ejection direction D is perpendicular to the farm field surface G, for example, spraying is carried out again with respect to a place that has already been subjected to spraying (see FIG. 7).

Alternatively, for example, in a case where a sowing machine is used as the implement 3, seeds are sowed in an identical place. In a case where the tractor 1 starts descending the slope illustrated in FIG. 7, the implement 3 inclines in the traveling direction with respect to the farm field surface G. This creates a place where no seed is sowed. That is, work is unfortunately unevenly carried out by location. Therefore, the ejection direction D of the nozzle 64 of the implement 3 desirably always has a constant inclination (e.g., 90°) with respect the farm field surface G.

Thus, the implement 3 controls the inclination of the implement 3 as below in accordance with unevenness of the farm field surface G.

In step S201, in a case where the tractor 1 starts traveling, the posture monitoring section 103 starts monitoring the positional relationship between the implement 3 and the farm field surface G. Specifically, the posture monitoring section 103 monitors an inclination of the ejection direction D of the nozzle 64 with respect to the farm field surface G.

In step S202, the posture monitoring section 103 detects that the positional relationship between the implement 3 and the farm field surface G has been changed. The posture monitoring section 103 that has detected a change in positional relationship notifies the oil hydraulic control section 104 that the positional relationship has been changed. The oil hydraulic control section 104 proceeds from YES in S202 to S203.

In Preferred Embodiment 1, the posture monitoring section 103 detects, for example, that each of the following cases is a change in positional relationship.

Case 1: a case where the inclination of the reference axis Ti of the implement 3 has been changed in accordance with a change in angle of the lower links 51

Case 2: a case where the inclination of the reference axis Ti of the implement 3 has been changed (the tractor 1 approaches the farm field surface G that is different in inclination) in accordance with a change in inclination of the reference axis Tt of the tractor 1

Case 3: a case where the implement 3 following the tractor 1 approaches, after the case 2, the farm field surface G that is different in inclination (described earlier)

The posture monitoring section 103 detects the case 1 in accordance with the oil hydraulic control section 104 having controlled the at least one oil hydraulic control valve 18 so as to change the shape of the lift rod. In accordance with a value measured by the inertial sensor (e.g., an IMU) provided in the tractor 1, the posture monitoring section 103 detects the case 2 in a case where the inclination of the reference axis Tt of the tractor 1 has been changed. In accordance with (i) the inclination data of the farm field surface G on which the tractor 1 has traveled earlier, (ii) a traveling speed of the tractor 1, and (ii) a size of the implement 3 which size has been made clear in advance, the posture monitoring section 103 detects the case 3 by predicting a timing at which the implement approaches the farm field surface G that is different in inclination. The size of the implement 3 which size has been made clear in advance is, for example, a distance from a reference position of the tractor 1 to the tip of the nozzle 64.

The following description will discuss, with reference to FIGS. 7 and 8, an example of a method for detecting the case 2. It is assumed that the tractor 1 ascends the upward slope of the farm field surface G from the right side to the left side in FIG. 7 while towing the implement 3, and the tractor 1 reaches a peak of the farm field surface G earlier and then descends the downward slope.

As illustrated in FIG. 7, in a case where the tractor 1 approaches the downward slope, the posture monitoring section 103 detects, in accordance with a value measured by the inertial sensor of the tractor 1, that the reference axis Tt has inclined at an angle of θt1 with respect to a virtual plane G' that is perpendicular to a direction of gravity of the earth. That is, the posture monitoring section 103 detects, as in the case 2, that the tractor 1 has entered a descent from an ascent.

In steps S203 to S206, the oil hydraulic control section 104 obtains various pieces of information for calculating the target top link length L that causes the positional relationship between the nozzle 64 and the farm field surface G to be an appropriate positional relationship. The appropriate positional relationship is, for example, a positional relationship in which the ejection direction D and the farm field surface G are perpendicular to each other. The oil hydraulic control section 104 can carry out S203 to S206 in any order.

In step S203, the oil hydraulic control section 104 obtains an inclination of the tractor 1. For example, the oil hydraulic control section 104 obtains, from the storage section 22, an inclination θt1 of the reference axis Tt, which inclination has been specified by the posture monitoring section 103.

In step S204, the oil hydraulic control section 104 obtains the angle of the lower links 51. The current angle of the lower links 51 is maintained in the storage section 22 as described earlier.

In step S205, the oil hydraulic control section 104 obtains the top link length L. A current length of the top link 50 is similarly maintained in the storage section 22.

In step S206, the oil hydraulic control section 104 obtains the inclination data of the farm field surface G that the agricultural machine 100 has passed so far. The oil hydraulic control section 104 obtains the inclination data of the farm field surface G that is located immediately below at least the tractor 1 and the implement 3.

In step S207, the oil hydraulic control section 104 specifies a current inclination of the ejection direction D of the nozzle 64 with respect to the farm field surface G in accordance with pieces of information which pieces have been obtained in respective steps S203 to S206. The following description will refer to the current inclination as a current nozzle angle. In the example illustrated in FIG. 7, the oil hydraulic control section 104 specifies the current nozzle angle θ1.

In step S208, the oil hydraulic control section 104 refers to the association information 211 so as to determine the target top link length L for causing the current nozzle angle θ1 to be 90°. The association information 211 is, as described earlier, information indicative of a correspondence, in a case where the angle of the lower links 51 is a predetermined angle, between (a) a length for which to extend or shorten the top link 50 and (b) an angle at which the implement 3 inclines forward or inclines backward. In the examples illustrated in FIGS. 7 and 8, the oil hydraulic control section 104 uses (i) the current angle of the lower links 51, (ii) the current length L1 of the top link 50, (iii) the current nozzle angle θ1, and (iv) a proper nozzle angle (90°) as an input so as to obtain the target top link length L2 in accordance with the association information 211.

In step S209, the oil hydraulic control section 104 controls the at least one oil hydraulic control valve 18 so that the length of the top link 50 is the target top link length L2 obtained in S208. In the examples illustrated in FIGS. 7 and 8, the oil hydraulic control section 104 controls the at least one oil hydraulic control valve 18 so as to extend the top link 50. This causes the implement 3 to incline backward at an angle of θ2. As a result, the reference axis Ti of the implement 3 is parallel to the farm field surface G, and a positional relationship between the ejection direction D of the nozzle 64 and the farm field surface G is corrected so that the ejection direction D of the nozzle 64 and the farm field surface G are perpendicular to each other.

As described earlier, the implement control unit 30 can adjust the top link 50 of the tractor 1. Note, however, that the top link length L, which varies according to the tractor 1, is difficult to adjust. It is therefore more efficient that the inclination control process be carried out on the tractor 1 side. Furthermore, since the tractor 1 travels in advance of the implement 3, the inclination control process that is carried out with use of the inertial sensor provided in the tractor 1 has an advantage of allowing a quick response to unevenness of the farm field surface G which unevenness changes every moment.

The implement 3 whose posture is to be automatically controlled is not limited to a chemical solution spraying machine. The above-described configuration in accordance with an aspect of the present disclosure is also applicable to, for example, automatic control carried out, in accordance with unevenness of a farm field surface, with respect to the posture of the implement 3 for carrying out plowing, such as a plow or a rotary. In this case, for example, the vehicle control unit detects an inappropriate plowing depth position of the implement 3 in accordance with a change in traction load. It is considered that the vehicle control unit 13 amends the inappropriate plowing depth position of the implement 3 to an appropriate position by controlling the connecting unit 19 so as to make the traction load appropriate.

The storage section 21 of the tractor 1 can store therein inclination data of a farm field for the past few years. By using such past inclination data to control the top link length L in accordance with unevenness, the vehicle control unit 13 can more accurately control the posture of the implement 3 in quick response to unevenness of the farm field.

The inclination data has, for example, a data structure in which an inclination value indicative of an inclination of the farm field surface is associated with latitude/longitude information. The inclination value that is stored for each latitude/longitude coordinate can be an average of inclination values, measured at an identical position, for the past few years.

The vehicle control unit 13 obtains, by, for example, a global positioning system (GPS), a current position of the tractor 1 that is traveling. Then, in accordance with the current position, the vehicle control unit 13 extracts, from the inclination data, an inclination value of a path along which the tractor 1 is to travel. The oil hydraulic control section 104 can predict, from the inclination value thus extracted, unevenness of the path along which the tractor 1 is to travel. This allows the oil hydraulic control section 104 to control the top link length L in accordance with the unevenness thus predicted.

The above-described configuration allows the oil hydraulic control section 104 to understand unevenness of the farm field surface in advance and thus appropriately control the posture of the implement 3 in quick response to a sudden change in slope.

The vehicle control unit 13 can be configured to use a deep learning model of artificial intelligence (AI) to carry out posture control with respect to the implement 3. In this case, for example, the deep learning model is constructed so as to use a traveling condition as an input to output a posture control map on which the target top link length L at each point in the farm field is plotted. Examples of the traveling condition that serves as input information include (a) a speed of the tractor 1, (b) a speed at which to control extension or shortening of the top link 50, (c) an inclination angle of the farm field surface G, (d) information indicating whether the tractor 1 is traveling upward or traveling downward, (e) a property of soil of the farm field, and (f) a moisture content in the farm field.

Machine learning for constructing the deep learning model (described earlier) is carried out with use of, for example, training data prepared as below.

The training data is prepared in accordance with an enormous amount of past driving record information that is obtained in a case where the agricultural machine 100 is caused to travel. Driving record information includes, as specification information of the tractor 1 having traveled, a speed at which to extend or shorten the top link 50. The driving record information also includes map information obtained by plotting, on map data of the farm field on which the tractor 1 has traveled, a traveling path, a traveling speed, an inclination angle, and the top link length L. The driving record information also includes, for example, (i) a property of soil of the farm field on which the tractor 1 has traveled and (ii) a moisture content in the farm field.

In a learning phase, a learning device (not illustrated) extracts, from an enormous amount of past driving record information, large amounts of combinations of (i) the traveling condition serving as the input information and (ii) the posture control map serving as output information. The learning device uses such a "traveling condition-posture control map" pair as the training data to carry out machine learning with respect to a correspondence between the traveling condition and the posture control map so as to obtain the deep learning model (described earlier).

The deep learning model obtained as described earlier is provided in the vehicle control unit 13. In an inference phase, the deep learning model uses the traveling condition as an input to infer the posture control map on which the target top link length L at each point in the farm field is plotted. Examples of the traveling condition include, as described earlier, (a) a speed of the tractor 1, (b) a speed at which to control extension or shortening of the top link 50, (c) an inclination angle of the farm field surface G, (d) information indicating whether the tractor 1 is traveling upward or traveling downward, (e) a property of soil of the farm field, and (f) a moisture content in the farm field. In accordance with the posture control map that has been supplied from the deep learning model, the oil hydraulic control section 104 can carry out posture control with respect to the implement 3 by regulating the top link length L in accordance with the current position of the tractor 1.

In accordance with a value measured by the inertial sensor provided in the tractor 1, the vehicle control unit 13 stores, in the storage section 22, inclination data showing the inclination angle of the farm field surface G. The posture monitoring section 103 can specify, in accordance with past inclination data, a posture of the tractor 1 such as whether the tractor 1 is ascending or descending a slope. For the purpose of easy calculation, the posture monitoring section 103 can use an average of angles of the slope. Specifically, the posture monitoring section 103 can regard, as an inclination angle of an upward slope or a downward slope, a value into which chronological measured values are integrated, the chronological measured values having been obtained by the inertial sensor during a period from a start to an end of the upward slope or the downward slope. Alternatively, for the purpose of easy calculation, the posture monitoring section 103 can (i) determine an angle from a value measured by the inertial sensor at a starting point of the upward slope or the downward slope and (ii) regard the angle thus determined as an inclination angle of the upward slope or the downward slope as a whole. The inclination data can be obtained by mapping, on map data of the farm field, a measured value obtained by, for example, the inertial sensor, and can be stored in the operation terminal 11. The vehicle control unit 13 can calculate the inclination angle of the farm field surface G from the inclination data stored in the operation terminal 11.

Control blocks (particularly, the posture monitoring section 103 and the oil hydraulic control section 104) of the vehicle control unit 13 can be realized by a logic circuit (hardware) provided in an integrated circuit (IC chip) or the like or can be alternatively realized by software.

Control blocks (particularly, the information obtaining section 101 and the nozzle height determining section 102) of the implement control unit 30 can be realized by a logic circuit (hardware) provided in an integrated circuit (IC chip) or the like or can be alternatively realized by software.

In the latter case, the vehicle control unit 13 and the implement control unit 30 each include a computer which executes instructions of a program that is software realizing the foregoing functions. The computer not only includes, for example, at least one processor but also includes a storage medium in which the program is computer-readably recorded. A preferred embodiment of the present invention can include the processor reading and executing, in the computer, the program stored in the storage medium. Examples of the processor include a central processing unit (CPU). Examples of the storage medium encompass "a non-transitory tangible medium" such as not only a read only memory (ROM) but also a tape, a disk, a card, a semiconductor memory, and a programmable logic circuit. The computer can further include, for example, a random access memory (RAM). The program can be supplied to or made available to the computer via any transmission medium (such as a communication network or a broadcast wave) which allows the program to be transmitted. Note that an aspect of a preferred embodiment of the present invention can also be achieved in the form of a computer data signal in which the program is embodied via electronic transmission and which is embedded in a carrier wave.

The present invention is not limited to the preferred embodiments, but can be altered by a skilled person in the art within the scope of the claims. The present invention also encompasses, in its technical scope, any preferred embodiment derived by combining technical features disclosed in differing preferred embodiments.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A traveling vehicle comprising:
    a controller to control a posture of a work machine that is provided to the traveling vehicle via a connector; wherein
    the controller is configured or programmed to control the posture of the work machine, in a case where a positional relationship between (a) a farm field surface on which the traveling vehicle travels and (b) the work machine has been changed from a predetermined positional relationship, so that the positional relationship thus changed is reset to the predetermined positional relationship; and
    the controller is configured or programmed to include:
        a monitoring section to detect a change in positional relationship between the farm field surface and the work machine in accordance with an arrival of the work machine, following the traveling vehicle, at a point at which an inclination of the traveling vehicle has been changed; and
        a control section to change a shape of the connector so as to control the posture of the work machine so that the positional relationship whose change has been detected by the monitoring section is reset to the predetermined positional relationship.

2. The traveling vehicle as set forth in claim 1, wherein the connector includes a three point linkage mechanism; and
    the control section controls the posture of the work machine by extending or shortening a length of a top link of the three point linkage mechanism.

3. The traveling vehicle as set forth in claim 2, wherein the controller is configured or programmed to include:
    a storage section to store therein association information indicative of a correspondence among (a) an angle of a lower link of the three point linkage mechanism, (b) the length of the top link, and (c) the posture of the work machine;
    the control section determines that the length of the top link is a target length, the length corresponding, in the association information, to (i) the angle of the lower link which angle is obtained in a case where the positional relationship between the farm field surface and the work machine has been changed and (ii) a target posture of the work machine to allow the farm field surface and the work machine to be in the predetermined positional relationship; and
    the control section controls the top link so that the top link has the target length.

4. The traveling vehicle as set forth in claim 3, wherein the control section specifies the target posture of the work machine in accordance with inclination data (i) obtained in advance concerning a farm field on which the traveling vehicle is traveling and (ii) showing unevenness of the farm field.

5. The traveling vehicle as set forth in claim 1, wherein the control section controls the length of the top link in accordance with a posture control map that has been outputted by a deep learning model and on which a target top link length is plotted for each point in the farm field on which the traveling vehicle is traveling; and
    the deep learning model is constructed so as to output the posture control map, by machine learning, by using, as an input, a traveling condition including at least one of (a) a speed of the traveling vehicle, (b) a speed at which to control extension or shortening of the top link, (c) an inclination angle of the farm field surface, (d) information indicating whether the traveling vehicle is traveling upward or traveling downward, (e) a property of soil of the farm field, and (f) a moisture content in the farm field.

* * * * *